United States Patent [19]
Langseth et al.

[11] Patent Number: 5,748,419
[45] Date of Patent: May 5, 1998

[54] WRITE PROTECT MECHANISM WITH SPRING ELEMENT FOR DATA STORAGE DISKETTE AND FABRICATION METHOD

[75] Inventors: Lee M. Langseth, Wahpeton, N. Dak.; James J. Wulfing, Stillwater; David L. Hubbling, Breckenridge, both of Minn.; Jerome V. Gagnier, Wahpeton, N. Dak.

[73] Assignee: Imation Corp., Oakdale, Minn.

[21] Appl. No.: 516,166

[22] Filed: Aug. 17, 1995

[51] Int. Cl.⁶ .......................... G11B 23/03; G11B 15/04; G11B 19/04
[52] U.S. Cl. .......................... 360/133; 369/291
[58] Field of Search .................. 360/133, 132, 360/60; 369/291

[56] References Cited

U.S. PATENT DOCUMENTS

| | | | |
|---|---|---|---|
| Re. 33,961 | 6/1992 | Swinburne et al. | 360/133 |
| 4,460,930 | 7/1984 | Takahashi | 360/60 |
| 4,536,812 | 8/1985 | Oishi et al. | 360/133 |
| 4,805,061 | 2/1989 | Champagne et al. | 360/133 |
| 5,121,279 | 6/1992 | Saeki et al. | 360/133 |
| 5,272,693 | 12/1993 | Fujisawa et al. | 369/291 |
| 5,331,499 | 7/1994 | Marcusen | 360/133 |
| 5,367,422 | 11/1994 | Fujisawa et al. | 360/133 |

FOREIGN PATENT DOCUMENTS

| | | |
|---|---|---|
| A0 327 008 | 8/1989 | European Pat. Off. . |
| 0 376 570 B1 | 7/1990 | European Pat. Off. . |
| 0 529 270 A2 | 3/1993 | European Pat. Off. . |
| A0 529 270 | 3/1993 | European Pat. Off. . |
| A0 533 463 | 3/1993 | European Pat. Off. . |

Primary Examiner—Stuart S. Levy
Assistant Examiner—William R. Korzuch
Attorney, Agent, or Firm—Eric D. Levinson

[57] ABSTRACT

A write protect mechanism includes an indicator element configured for movement within a channel to indicate a write condition and a write protect condition of a data storage diskette. The indicator element can be integrally molded with the diskette housing. The indicator element is disengaged from the housing, rotated approximately ninety degrees, and reinserted in the channel prior to closing the diskette. The diskette permanently retains the indicator element within the channel. The indicator element may include spring members for exerting a bias against structures formed along side walls of the channel during movement. The spring members may include indentations for engaging the structures formed on the side walls. The structures are aligned with positions indicating either the write condition or write protect condition of the diskette.

21 Claims, 5 Drawing Sheets

WRITE PROTECT MECHANISM WITH SPRING ELEMENT FOR DATA STORAGE DISKETTE AND FABRICATION METHOD

FIELD OF THE INVENTION

The present invention relates generally to data storage diskettes and, more particularly, to write protect mechanisms for use in data storage diskettes.

DISCUSSION OF RELATED ART

Data storage diskettes generally include a write protect mechanism. The write protect mechanism indicates to both the user and the diskette drive that the data storage diskette is in either a write condition or a write protect condition. The write protect mechanism prevents the contents of the diskette from being inadvertently overwritten. The write protect mechanism typically includes an indicator element mounted within a channel formed in the diskette housing. The indicator element is movable along the length of the channel to indicate the condition of the diskette. In one position, the indicator element specifies the write condition. In another position, the indicator element specifies the write protect condition.

In most existing data storage diskettes, the indicator element is a separately formed component that is placed in the channel during the diskette manufacturing process. In contrast, U.S. Pat. No. 4,460,930, to Takahashi, discloses a write protect mechanism, for a data storage diskette, having an indicator element that is integrally molded with the diskette housing. An end user receives the diskette with the indicator element in its integrally molded condition. For use, the indicator element is "torn off" of the diskette housing by the end user, rotated approximately ninety degrees, and then placed within a recess in the diskette housing. The indicator element includes two "elastic stoppers" that ride in grooves along the channel to hold the indicator in place.

The molding of the indicator element into the diskette housing, as disclosed by the Takahashi patent, eliminates the need for fabrication and placement of a separate component within the housing, and thereby affords reductions in manufacturing cost. Although the reduced manufacturing cost is attractive, the write protect mechanism disclosed by the Takahashi patent suffers from a number of problems that may make it less desirable than other mechanisms.

For example, the end user is charged with the responsibility of readying the indicator element for use. Although the task may appear simple, experience shows that delegating such activity to the end user can create significant confusion and inconvenience. Detachment of the indicator element by the end user also can adversely affect the operation of the write protect mechanism. When the indicator element is "torn off" by the end user, for example, the detached indicator element can have rough edges along the line of tearing. The rough edges can make movement of the indicator element along the channel difficult or, at least, provide an inconsistent feel to the end user. In particular, the rough edges can affect the tolerances between the channel width and the width of the indicator element. The tearing carried out by the end user also can produce debris. The debris can remain inside the diskette housing, possibly contaminating the storage medium to the point of data loss. Finally, the indicator element, although retained in the grooves, can be removed by the end user or fall out of the channel, resulting in loss.

The structure of the write protect mechanism disclosed by the Takahashi patent produces several additional problems.

As mentioned above, rough edges of the indicator element can produce debris and affect movement. In addition, during movement of the indicator element, the sides of the indicator element slide along side walls of the channel. The sliding action can produce excessive wear on the indicator element, producing additional debris and affecting movement over a period of use. The direct contact of the sides of the indicator element with the side walls of the channel also decreases the tolerances for fitting the indicator element within the channel. If the width of the indicator element is too small, the indicator element will slide along the channel too freely, possibly preventing the indicator element from staying in the write or write protect position. If the width of the indicator element is too large, movement within the channel will be difficult or impossible, causing end user inconvenience or requiring the diskette to be destroyed for quality reasons. Finally, to enable the indicator element of the Takahashi patent to be reinserted into the channel by the end user, the indicator element is made with a thinned out area. The thinned out area adds flexibility to the indicator element so that it can be deformed for insertion. However, the thinned out area may make compliance with light transmittance specifications difficult. Specifically, existing indicator elements must be sufficiently opaque to enable sensing by an optical sensor. The thinned out area may transmit too much light for compliance with present specifications. The problem is compounded if the diskette is manufactured with lightly-colored or semi-transparent materials.

In view of the problems associated with the write protect mechanism disclosed by the Takahashi patent, there is a need for an improved write protect mechanism. In particular, there is a need for a write protect mechanism that provides the reduced manufacturing cost achieved by integrally molding the indicator element with the diskette housing, and overcomes the problems associated with the write protect mechanism disclosed by the Takahashi patent.

SUMMARY OF THE INVENTION

The present invention is directed to a data storage diskette with a write protect mechanism, and to a method for fabricating a data storage diskette with a write protect mechanism. The write protect mechanism in the data storage diskette of the present invention can be integrally molded with the diskette to provide reduced manufacturing cost. The indicator element also can reduce the cost of recycling the overall diskette. Specifically, because the indicator element and diskette housing are made from the same material, the indicator element need not be removed from the diskette housing prior to recycling. Further, the write protect mechanism in the data storage diskette of the present invention is capable of overcoming several problems associated with prior art write protect mechanisms.

For example, in accordance with the present invention, the integrally molded indicator element is disengaged and placed in the channel of the write protect mechanism prior to closing the diskette housing and in advance of distribution to the end user. The indicator element is thereby permanently retained within the diskette housing. As a result, the end user need not suffer the inconvenience and/or confusion of handling the indicator element, and cannot lose the indicator element.

In addition, the integrally molded indicator element can be severed from the diskette housing during the assembly process with a cutting tool, rather than being manually "torn off" by an end user. Disengagement by a cutting action during assembly can avoid rough edges along the indicator element and resulting inconsistency of movement within the channel, prevent the production of excess debris, and enable more precise compliance with dimensional tolerances.

The indicator element of the write protect mechanism of the present invention may incorporate spring members having indentations configured to engage protrusions formed in side walls of the channel. The protrusions are formed along the length of the channel at positions corresponding to write and write protect positions. The spring members are biased against the protrusions of the channel, providing positive locking force between the indentations and the protrusions at the write and write protect positions. The spring members also compensate for dimensional irregularities between the protrusions and the indicator element due to both the manufacturing process and wear caused by use. The spring members thereby relax dimensional tolerances and ensure consistent movement of the indicator element within the channel over time.

Finally, the indicator element need not include a thinned out area for flexibility. Rather, the spring members provide desired bias against the protrusions, and the indicator element need not be deformed for insertion into the channel. Thus, the indicator element can be made with a thickness that more readily enables compliance with applicable light transmission specifications.

In a first embodiment, the present invention provides a data storage diskette comprising a diskette housing, a data storage medium contained in the diskette housing, and a write protect mechanism formed in the diskette housing, the write protect mechanism including a channel formed in the diskette housing, wherein the channel includes an interior side wall having a structure that extends into the channel, and an indicator element movable along a length of the channel to indicate a write protect condition of the data storage diskette and a write condition of the data storage diskette, wherein the indicator element includes a spring member integrally molded with the indicator element, the spring member including an indentation, the indentation engaging the structure formed in the interior side wall of the channel during a portion of the movement of the indicator element along the length of the channel, the engagement of the structure and the indentation exerting a force against movement of the indicator element along the length of the channel.

In a second embodiment, the present invention provides a write protect mechanism for a data storage diskette, the write protect mechanism comprising a channel formed in a diskette housing associated with the data storage diskette, wherein the channel includes an interior side wall having a structure that extends into the channel, and an indicator element movable along a length of the channel to indicate a write protect condition of the data storage diskette and a write condition of the data storage diskette, wherein the indicator element includes a spring member integrally molded with the indicator element, the spring member including an indentation, the indentation engaging the structure formed in the interior side wall of the channel during a portion of the movement of the indicator element along the length of the channel, the engagement of the structure and the indentation exerting a force against movement of the indicator element along the length of the channel.

In a third embodiment, the present invention provides a method of fabricating a data storage diskette, the method comprising the steps of molding a first half of a diskette housing, molding a second half of a diskette housing, molding a channel into a portion of one of the first half and the second half of the diskette housing, molding an indicator element into a portion of one of the first half and the second half of the diskette housing, the indicator element thereby being integrally molded with the diskette housing, disengaging the indicator element from the diskette housing, placing the disengaged indicator element within the channel, the indicator element being movable along a length of the channel to indicate a write protect condition of the data storage diskette and a write condition of the data storage diskette, placing a data storage medium within one of the first half of the diskette housing and the second half of the diskette housing, and joining the first half and the second half of the diskette housing, thereby enclosing the data storage medium and the indicator element.

DETAILED DESCRIPTION OF THE PREFERRED EMBODIMENTS

Figure 1:
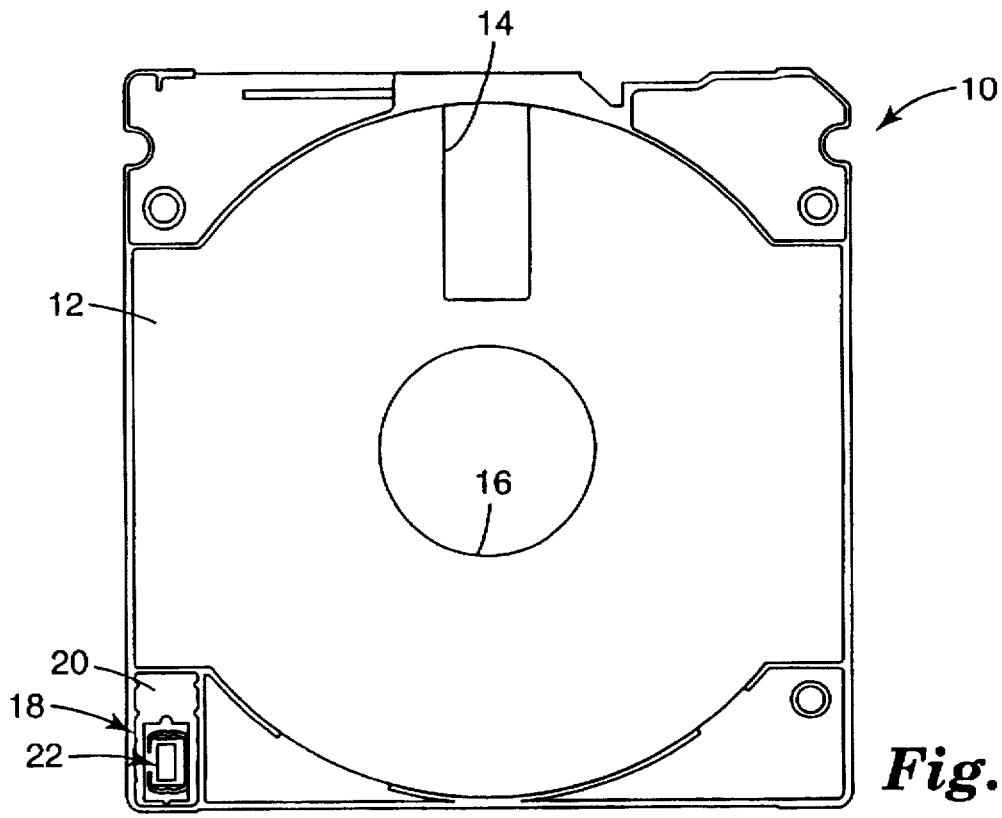
FIG. 1 is plan view of the interior of a first half of a diskette housing in a data storage diskette incorporating a write protect mechanism having an integrally molded indicator element, in accordance with the present invention.

FIG. 1 is a plan view of the interior of a first half 10 of a diskette housing in a data storage diskette incorporating a write protect mechanism having an integrally molded indicator element, in accordance with the present invention. The first half 10 of the diskette housing, excluding the write protect mechanism, conforms substantially to that of a conventional 3.5 inch diskette housing for magnetic media. It is conceivable, however, that the write protect mechanism of the present invention can be made applicable to other types of data storage diskettes having other form factors. Examples of such alternative diskettes include diskettes containing magneto-optical or rewritable optical storage media.

As shown in FIG. 1, first half 10 of the diskette housing includes an interior wall 12. A media access opening 14 is formed in interior wall 12. The media access opening 14 enables read and write heads associated with a diskette drive to access the storage media contained in the housing for data read and write operations. In addition, first half 10 includes a media hub opening 16 formed in interior wall 12. The media hub opening 16 enables a motor associated with the diskette drive to engage a hub on the storage media in order to rotate the media for read and write operations.

The first half 10 further includes a write protect mechanism 18, in accordance with the present invention, comprising a channel 20 and an indicator element 22. The indicator element 22 is integrally molded with first half 10 of the diskette housing. The first half 10 and its accompanying structural features can be formed by injection molding with a conventional plastic material such as, for example, high impact polystyrene, ABS, polycarbonate, or polyethylene. The media access opening 14, media hub opening 16, channel 20, and indicator element 22 can be formed integrally with first half 10 during the injection molding process with a common mold. The single molding step eliminates manufacturing costs that otherwise would be incurred if indicator element 22 were formed separately from first half 10. The integrally molded indicator element 22 also reduces the cost of recycling the overall diskette. Specifically, because indicator element 22 and the diskette housing are made from the same material, the indicator element need not be removed from the diskette housing prior to recycling.

Figure 2:
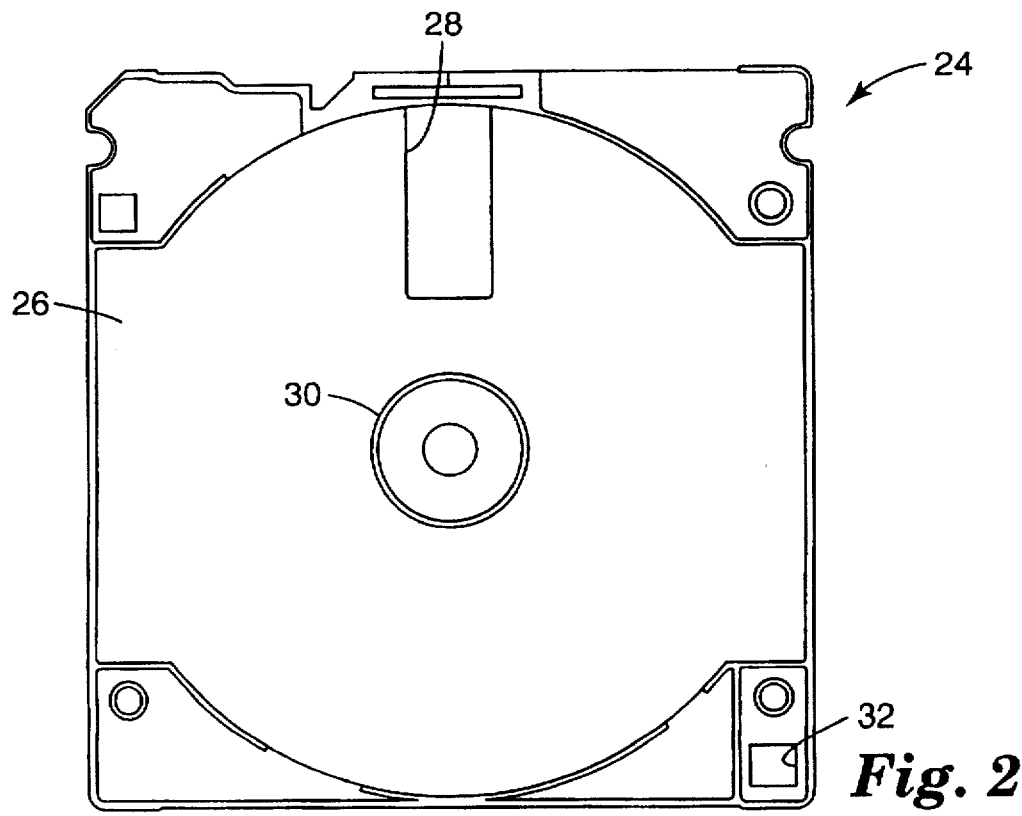
FIG. 2 is a plan view of the interior of a second half of a diskette housing in a data storage diskette incorporating a write protect mechanism having an integrally molded indicator element, in accordance with the present invention.

FIG. 2 is a plan view of the interior of a second half 24 of a diskette housing in a data storage diskette incorporating a write protect mechanism having an integrally molded indicator element, in accordance with the present invention. As shown in FIG. 2, second half 24 includes an interior wall 26, a media access opening 28, and a rib 30 over which the media hub is positioned. The second half 24 further includes a window 32. The window 32 is positioned to align with a portion of channel 20 upon assembly of the overall diskette by joining first half 10 and second half 24 of the diskette housing together. The window 32 enables a sensor to access indicator element 22 to determine whether the indicator element is in a position indicating a write condition or a position indicating a write protect condition.

Figure 3:
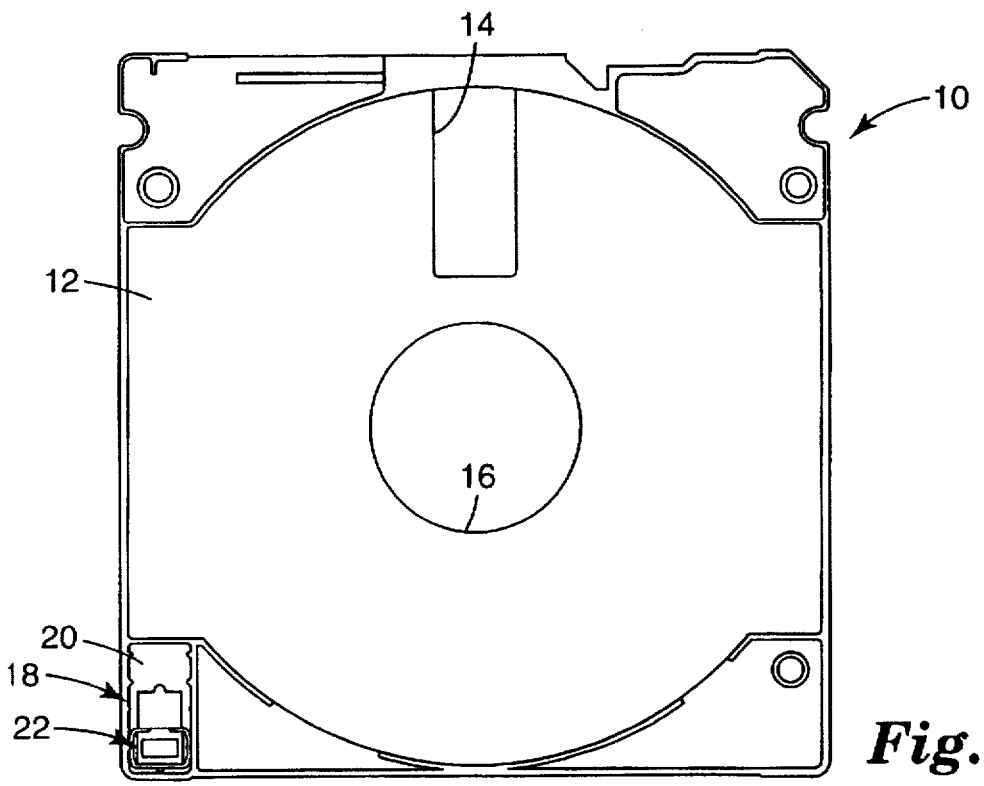
FIG. 3 is a plan view of the interior of the first half of the diskette housing shown in FIG. 1 after disengagement and reinsertion of the integrally molded indicator element, in accordance with the present invention.

FIG. 3 is a plan view of the interior of first half 10 of the diskette housing shown in FIG. 1 after disengagement and replacement of the integrally molded indicator element 22 within channel 20, in accordance with the present invention. After completion of the injection molding process, indicator element 22 is coupled to an interior side wall of channel 20 by a thin link. The indicator element 22 is disengaged from first half 10 by, for example, severing the link with a cutting tool such as a punch, or exerting a pushing or pulling force on the indicator element sufficient to forcibly break the link. Disengagement of indicator element 22 by a cutting action during assembly can avoid rough edges along the indicator element and resulting inconsistency of movement within channel 20, prevent the production of excess debris, and enable more precise compliance with dimensional tolerances.

After indicator element 22 has been disengaged from first half 10, the indicator element is rotated approximately ninety degrees and reinserted into channel 20. An automated tool may be used to perform each of the functions of disengagement, rotation, and reinsertion of indicator element 22 in rapid succession. The indicator element 22 has a length selected to freely fit within the width of channel 20. The first half 10 and second half 24 later can be joined together to form a data storage diskette enclosing both indicator element 22 and a sheet of storage media and associated hardware. The window 32 of second half 24 is sized to allow only a portion of indicator element 22 to be accessed by a write protect sensor in the diskette drive. Consequently, indicator element 22 is permanently retained within channel 20 by first and second halves 10, 24 of the diskette housing.

Figure 4:
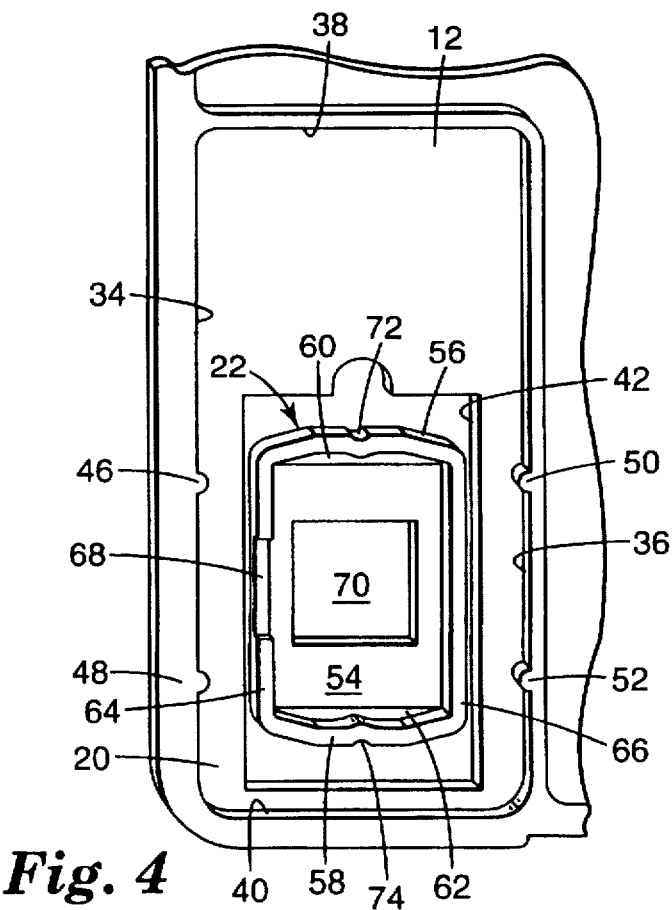
FIG. 4 is an enlarged view of the integrally molded indicator element, in accordance with the present invention, from the interior of the first half of the diskette housing.

FIG. 4 is an enlarged view of integrally molded indicator element 22, in accordance with the present invention, from the interior of first half 10 of the diskette housing. As shown in FIG. 4, the injection molding process produces in first half 10 a first side wall 34, a second side wall 36, a top side wall 38, and a bottom side wall 40, all of which define channel 20. The indicator element 22 is formed within channel 20 and is separated from interior wall 12 of first half 10 by a window area 42. The indicator element 22 is attached to interior surface 12 of first half 10 along a side 44 of window area 42 via a thin link (not shown in FIG. 4). The channel 20 is molded such that first side wall 34 includes first and second structures 46, 48 that extend into the channel. Similarly, channel 20 is molded such that side wall 36 includes first and second structures 50, 52 that also extend into the channel. As shown in FIG. 4, structures 46, 48, 50, 52 may be formed with a button-like shape. Formation of indicator element 22 within channel 20 is preferred because of the close proximity of the indicator element and channel to one another. Thus, disengagement, rotation, and reinsertion of indicator element 22 requires very little overall movement. It is conceivable, however, that indicator element 22 could be integrally molded in another area of first half 10 or second half 24 of the diskette housing and moved to channel 20 without undue time or expense.

With further reference to FIG. 4, indicator element 22 is molded such that the indicator element includes a major portion 54 and peripheral portions 56, 58 formed at opposite ends of the major portion. The peripheral portions 56, 58 are slightly curved outward from major portion 54, and are partially separated from major portion 54 by peripheral apertures 60, 62, respectively. Although peripheral portions 56, 58 are slightly curved, indicator element 22 may remain substantially rectangular in shape. The indicator element 22 is further molded such that side walls 64, 66 are formed along opposite sides of major portion 54. The molding process may produce a cored-out area 68 of side wall 64, if desired, to facilitate handling of indicator element 22 with a locking finger during assembly. The major portion 54 of indicator element 22 may be recessed relative to peripheral portions 56, 58 and side walls 64, 66, if desired, to reduce the amount of plastic required to form the indicator element. In addition, the molding process may result in an additional cored-out recess 70 within major portion 54, if desired, to further reduce the amount of plastic consumed and to provide a surface that facilitates manipulation of indicator element 22 by assembly equipment.

The peripheral portions 56, 58 and peripheral apertures 60, 62 together form spring members that are integrally molded with indicator element 22. Specifically, peripheral portion 56 and peripheral aperture 60 form a first spring member, whereas peripheral portion 58 and peripheral aperture 62 form a second spring member. The peripheral apertures 60, 62 are formed during the molding process to partially separate peripheral portions 56, 58, respectively, from major portion 54. The peripheral apertures 60, 62 thereby impart to the peripheral portions 56, 58 added resilience. The width of peripheral apertures 60, 62 and thus the thickness of peripheral portions 56, 58 can be selected, as desired, to adjust the degree of resilience of the spring members, given the compliance characteristics of the particular plastic used in the molding process.

The molding process preferably is carried out such that indicator element 22 further includes indentations 72, 74 formed in peripheral portions 56, 58, respectively. As shown in FIG. 4, indentations 72, 74 can be formed at the outer centers of the curved peripheral portions 56, 58. The indentations 72, 74 are configured to engage structures 46, 48, 50, 52 formed on side walls 34, 36 of channel 20. Specifically, after indicator element 22 has been disengaged from first half 10, turned approximately ninety degrees, and then inserted in channel 20, indentation 74 is oriented to engage structures 46, 48 and indentation 72 is oriented to engage structures 50, 52, during movement of the indicator element along the length of the channel.

Upon disengagement, rotation, and insertion of indicator element 22 within channel 20, in accordance with the present invention, the spring members contribute to enhanced consistency of movement. Specifically, the added resilience enables the spring members to be biased against protrusions 46, 48, 50, 52 on side walls 34, 36 of channel 20 during movement of indicator element 22 along the length of the channel. The spring bias allows indicator element 22 to better accommodate variations in the width of protrusions 46, 48, 50, 52 of channel 20 and the width of the indicator element itself. Specifically, the spring members can undergo slight compression or slight expansion in response to deviation from width tolerances for either indicator element 22 or protrusions 46, 48, 50, 52 of channel 20. The spring members thereby compensate for dimensional irregularities along side walls 34, 36 of channel 20, as well as along the sides of indicator element 22 due to either the manufacturing process or wear over time. Thus, the spring members enable dimensional tolerances to be relaxed and ensure consistent movement of the indicator element within the channel over many cycles of use.

The spring members formed by peripheral portions 56, 58 and peripheral apertures 60, 62 also provide resilience to securely hold indicator element 22 upon engagement of indentations 72, 74 with protrusions 46, 48, 50, 52. As a result, indicator element 22 need not include a thinned out area for flexibility, because major portion 54 of the indicator element need not undergo any bending during insertion into channel 20 or movement along the length of the channel. Rather, the spring members provide desired bias against protrusions 46, 48, 50, 52. Thus, major portion 54 of indicator element 22 can be more easily made with a thickness sufficient to satisfy applicable light transmission specifications. Although an indicator element 22 having two spring members is preferred, it is conceivable that a single spring member formed on only one end of the indicator element could provide similar advantages.

Figure 5:
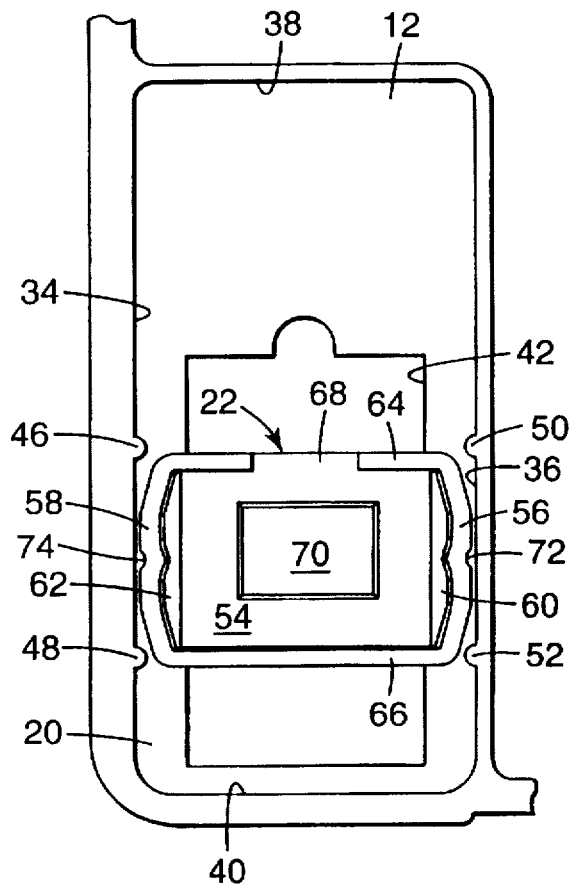
FIG. 5 is an enlarged view of the integrally molded indicator element, in accordance with the present invention, after disengagement and reinsertion for use.

FIG. 5 is an enlarged plan view of integrally molded indicator element 22, in accordance with the present invention, after disengagement, rotation, and reinsertion into channel 20. As shown in FIG. 5, structures 46 and 50 are aligned with one another in a direction perpendicular to movement of indicator element 22 within channel 20. Similarly, structure 48 and 52 are aligned with one another in a direction perpendicular to movement of indicator element 22 within channel 20. Structures 46 and 50 are formed along the length of channel 20 at positions corresponding to a write condition of the data storage diskette. Structures 48 and 52 are formed along the length of channel 20 at positions corresponding to a write protect condition of the data storage diskette. As indicator element 22 is moved along the length of channel 20 by the end user, indentation 74 encounter structures 46 and 48, and indentation 72 encounters structures 50 and 52.

The engagement of indentations 74 and 72 with structures 46, 48, 50, and 52 exerts a force against movement of indicator element 22 along the length of channel 20. The force is produced, in part, by a snap fit between indentations 74, 72 and structures 46, 48, 50, 52 upon engagement. The spring bias of peripheral portions 56, 58 adds to the force. The force serves to hold indicator element 22 at the position corresponding to the particular structures 46, 48, 50, 52 engaged with indentations 74, 72 until additional force is applied by the end user. Thus, when indentations 74, 72 engage structures 46, 50, respectively, indicator element 22 is locked in a position indicating a write condition of the diskette. When indentations 74, 72 engage structure 48, 52, respectively, indicator element 22 is locked in a position indicating a write protect condition of the diskette.

Figure 6:
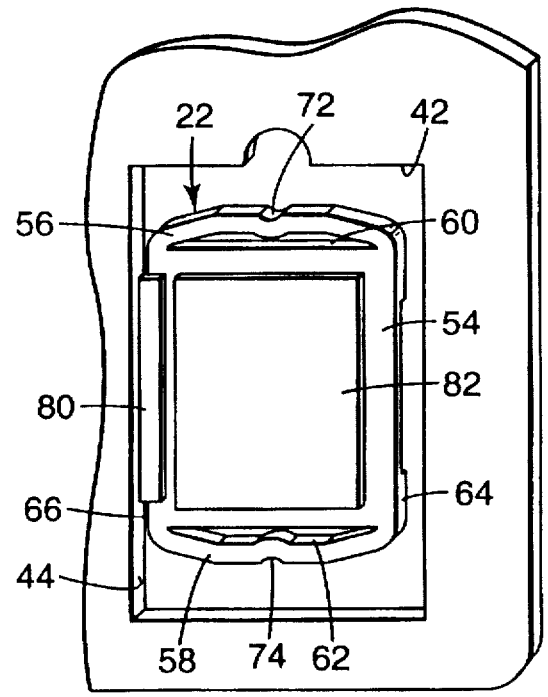
FIG. 6 is an enlarged view of the integrally molded indicator element, in accordance with the present invention, from the exterior of the first half of the diskette housing.

FIG. 6 is an enlarged view of integrally molded indicator element 22, in accordance with the present invention, from the exterior of first half 10 of the diskette housing. As shown in FIG. 6, after the molding process, indicator element 22 is coupled to side wall 44 of window area 42 via a thin link 80. As discussed earlier, indicator element 22 can be disengaged from first half 10 of the diskette housing by severing link 80 with a cutting tool such as a punch. As further shown in FIG. 6, major portion 54 of indicator element 22 includes a step 82 that protrudes from the major portion. The step 82 provides a button-like structure that can be accessed through window area 42. The step 82 can be easily manipulated and seen by the end user for operation of the write protect mechanism of the present invention.

Figure 7:
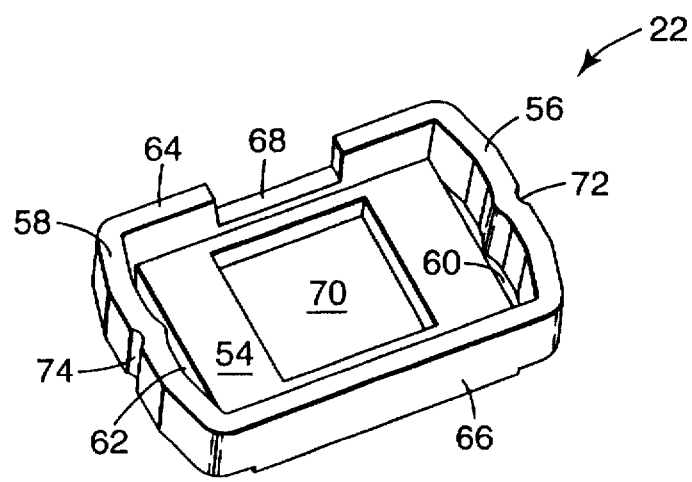
FIG. 7 is a perspective bottom view of an indicator element, in accordance with the present invention.

FIG. 7 is a perspective bottom view of indicator element 22. FIG. 7 further illustrates recess 70 and the recession of major portion 54 relative to peripheral portions 56, 58 and side walls 64, 66.

Figure 8:
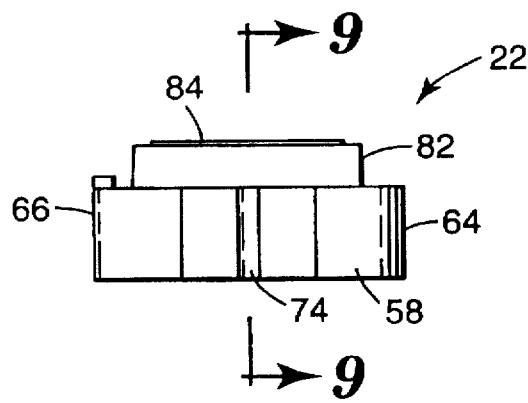
FIG. 8 is an end view of an indicator element, in accordance with the present invention.

FIG. 8 is an end view of indicator element 22 from the side on which peripheral portion 58 is formed. FIG. 8 further illustrates the incorporation of a second step 84 over step 82. The second step 84 also may be formed during the molding process and may include directional indicia for indicating to the end user the direction of movement of indicator element 22 within channel 20.

Figure 9:
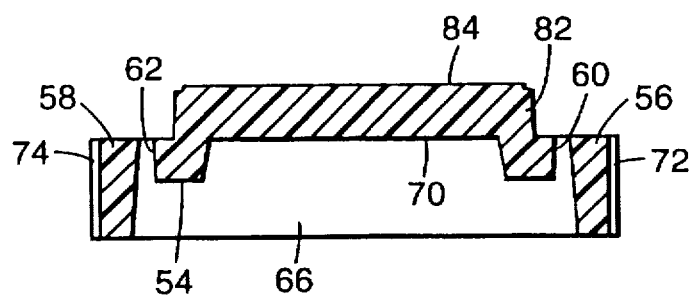
FIG. 9 is a cross-sectional side view of an indicator element, in accordance with the present invention.

FIG. 9 is a cross-sectional side view of indicator element 22 taken along line A–A' of FIG. 8.

Figure 10:
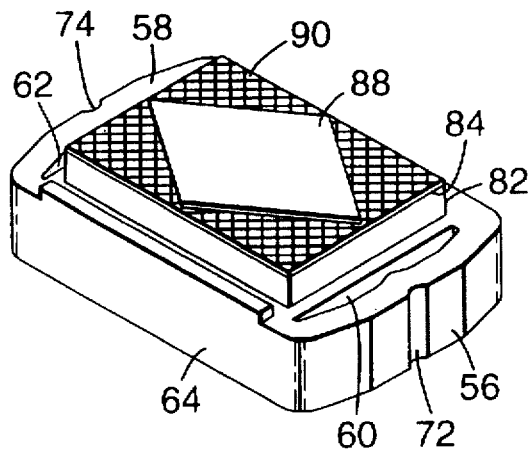
FIG. 10 is a perspective top view of an indicator element, in accordance with the present invention.

FIG. 10 is a perspective top view of indicator element 22. As shown in FIG. 10, second step 84 may include molded directional indicia such as, for example, a diamond-shaped pointer structure 88. In addition, second step 84 may include a textured region 90 to highlight pointer structure 88. The pointer structure 88 may be slightly raised relative to textured region 90.

Figure 11:
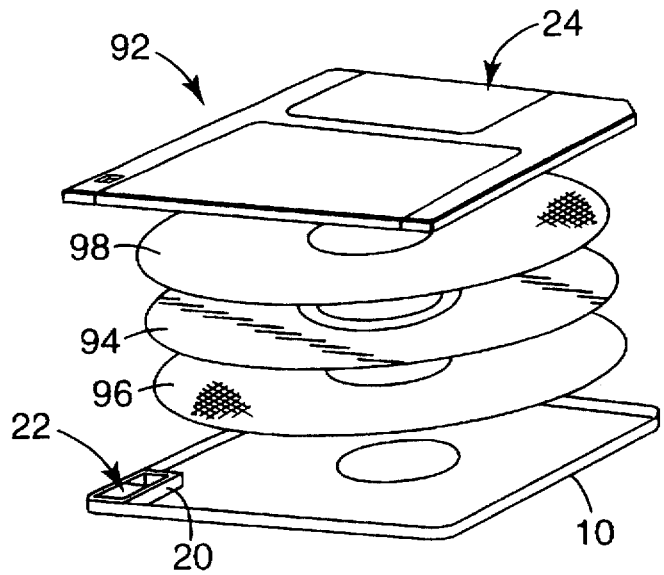
FIG. 11 is a perspective view illustrating assembly of a data storage diskette incorporating a write protect mechanism having an integrally molded indicator element, in accordance with the present invention.

FIG. 11 is a perspective view illustrating assembly of a data storage diskette 92 incorporating a write protect mechanism having an integrally molded indicator element 22 and channel 20, in accordance with the present invention. As shown in FIG. 11, the overall diskette 92 includes first half 10 of the diskette housing, within which channel 20 and indicator element 22 are integrally molded, and second half 24 of the diskette housing. Prior to joining first half 10 and second half 24 of the diskette housing, indicator element 22 is disengaged from the first half, rotated approximately ninety degrees, and reinserted in channel 20. In addition, a sheet of storage media 94 is placed between two fabric liners 96, 98 attached to the interior walls of first and second halves 10, 24, respectively. The first half 10 and second half 24 then are joined together, enclosing media 94 and fabric liners 96, 98, and permanently retaining indicator element 22 within channel 20. Upon assembly, steps 82, 84 protrude through channel 20 for access from the exterior of first half 10 by the user during operation of the resulting write protect mechanism. Thus, the integrally molded indicator element 22 is disengaged, rotated, and placed in channel 22 prior to closing the diskette housing and in advance of distribution to the end user. The indicator element is permanently retained within the diskette housing. As a result, the end user need not suffer the inconvenience and/or confusion of handling the indicator element, and cannot lose the indicator element.

What is claimed is:

1. A data storage diskette comprising:
   a diskette housing;
   a data storage medium contained in the diskette housing; and
   a write protect mechanism formed in the diskette housing, the write protect mechanism including:
   a channel formed in the diskette housing, wherein the channel includes a first interior side wall having a first structure that extends into the channel and a second interior side wall located opposite the first side wall, the second interior side wall having a second structure that extends into the channel;
   an indicator element movable along a length of the channel to indicate a write protect condition of the data storage diskette and a write condition of the data storage diskette, the indicator element further including a major portion and first and second peripheral portions, the first peripheral portion forming a first spring member having two ends, both ends being attached to the major portion, wherein the major portion and the first peripheral portion define a first aperture therebetween, and the second peripheral portion forming a second spring member having two ends, both ends being attached to the major portion, wherein the major portion and the second peripheral portion define a second aperture therebetween;
   wherein the first spring member is integrally molded with the indicator element, the first spring member including an indentation, the indentation engaging the first structure formed in the first interior side wall of the channel during a portion of the movement of the indicator element along the length of the channel, and further wherein the second spring member is integrally molded with the indicator element, the second spring member including an indentation, the indentation engaging the second structure formed in the second interior side wall of the channel during a portion of the movement of the indicator element along the length of the channel, the engagement of the first and second structures and indentations exerting a force against movement of the indicator element along the length of the channel.

2. The data storage diskette of claim 1, wherein the first and second structures are formed along the length of the channel at positions corresponding to the write protect condition of the data storage diskette and the write condition of the data storage diskette.

3. The data storage diskette of claim 1, wherein the indicator element is integrally molded with the diskette housing, the indicator element being disengaged from the diskette housing and placed within the channel for use.

4. The data storage diskette of claim 1, wherein the indicator element is integrally molded with the diskette housing within the channel, the indicator element being disengaged from the diskette housing and placed within the channel for use.

5. The data storage diskette of claim 1, wherein the indicator element is integrally molded with the diskette housing at an orientation rotated approximately ninety degrees from an orientation at which the indicator element is movable within the channel, the indicator element being disengaged from the diskette housing, rotated approximately ninety degrees, and placed within the channel for use.

6. A write protect mechanism for a data storage diskette, the write protect mechanism comprising:
   a channel formed in a diskette housing associated with the data storage diskette, wherein the channel includes a first interior side wall having a first structure that extends into the channel and a second interior side wall located opposite the first side wall, the second interior side wall having a second structure that extends into the channel; and
   an indicator element movable along a length of the channel to indicate a write protect condition of the data storage diskette and a write condition of the data storage diskette, the indicator element further including a major portion and first and second peripheral portions, the first peripheral portion forming a first spring member having two ends, both ends being attached to the major portion, wherein the major portion and the first peripheral portion define a first aperture therebetween, and the second peripheral portion forming a second spring member having two ends, both ends being attached to the major portion, wherein the major portion and the second peripheral portion define a second aperture therebetween;
   wherein the first spring member is integrally molded with the indicator element, the first spring member including an indentation, the indentation engaging the first structure formed in the first interior side wall of the channel during a portion of the movement of the indicator element along the length of the channel, and further wherein the second spring member is integrally molded with the indicator element, the second spring member including an indentation, the indentation engaging the second structure formed in the second interior side wall of the channel during a portion of the movement of the indicator element along the length of the channel, the engagement of the first and second structures and indentations exerting a force against movement of the indicator element along the length of the channel.

7. The write protect mechanism of claim 6, wherein the first and second structures are formed along the length of the channel at positions corresponding to the write protect condition of the data storage diskette and the write condition of the data storage diskette.

8. The write protect mechanism of claim 6, wherein the indicator element is integrally molded with the diskette housing, the indicator element being disengaged from the diskette housing and placed within the channel for use.

9. The write protect mechanism of claim 6, wherein the indicator element is integrally molded with the diskette housing within the channel, the indicator element being disengaged from the diskette housing and placed within the channel for use.

10. The write protect mechanism of claim 6, wherein the indicator element is integrally molded with the diskette housing at an orientation rotated approximately ninety degrees from an orientation at which the indicator element is movable within the channel, the indicator element being disengaged from the diskette housing, rotated approximately ninety degrees, and placed within the channel for use.

11. A method of fabricating a data storage diskette, the method comprising the steps of:

molding a first half of a diskette housing;

molding a second half of a diskette housing;

molding a channel into a portion of one of the first half and the second half of the diskette housing, the channel including first and second opposing interior side walls;

molding an indicator element into a portion of one of the first half and the second half of the diskette housing, the indicator element thereby being integrally molded with the diskette housing, the indicator element further including a major portion and first and second peripheral portions, the first peripheral portion forming a first spring member, wherein the first spring member is integrally molded with the indicator element and includes two ends both ends being attached to the major portion, wherein the major portion and the first peripheral portion define a first aperture therebetween, and the second peripheral portion forming a second spring member, wherein the second spring member is integrally molded with the indicator element and includes two ends, both ends being attached to the major portion, wherein the major portion and the second peripheral portion define a second aperture therebetween;

disengaging the indicator element from the diskette housing;

placing the disengaged indicator element within the channel wherein the first spring member exerts a force against the first interior side wall of the channel and the second spring member exerts a force against the second interior side wall of the channel, the indicator element being movable along a length of the channel to indicate a write protect condition of the data storage diskette and a write condition of the data storage diskette;

placing a data storage medium within one of the first half of the diskette housing and the second half of the diskette housing; and joining the first half and the second half of the diskette housing, thereby enclosing the data storage medium and the indicator element.

12. The method of claim 11, wherein the step of molding the indicator element includes molding the indicator element into a portion of one of the first half and the second half of the diskette housing within the channel.

13. The method of claim 11, wherein the step of disengaging the indicator element includes cutting the indicator element from one of the first half and the second half of the diskette housing.

14. The method of claim 11, wherein the step of molding the indicator element includes molding the indicator element such that the indicator element is integrally molded with one of the first half and the second half of the diskette housing at an orientation rotated approximately ninety degrees from an orientation at which the indicator element is movable within the channel.

15. The method of claim 14, wherein the step of placing the disengaged indicator element within the channel includes rotating the disengaged indicator element approximately ninety degrees prior to placing the disengaged indicator element with the channel.

16. The method of claim 11, wherein the step of molding the indicator element includes molding the indicator element such that the indicator element is coupled to one of the first and the second half of the diskette housing with a link, and further wherein the step of disengaging the indicator element from the diskette housing includes cutting the link.

17. The method of claim 11, wherein the step of joining the first half and the second half of the diskette housing includes joining the first half and the second half such that the indicator element is permanently retained within the channel by the first half and the second half.

18. The method of claim 11, wherein molding the channel further comprises molding a first structure in the first interior wall and a second structure in the second interior wall, and further wherein molding the indicator element further comprises molding the first spring member with a first indentation formed therein and molding the second spring member with a second indentation formed therein, wherein the first spring member engages the first structure in the first interior side wall of the channel during a portion of the movement of the indicator element along the length of the channel, and further wherein the second indentation engages the second structure formed in the second interior side wall of the channel during a portion of the movement of the indicator element along the length of the channel.

19. A data storage diskette comprising:

a diskette housing;

a data storage medium contained in the diskette housing; and a write protect mechanism formed in the diskette housing, the write protect mechanism including:

a channel formed in the diskette housing, the channel including first and second side walls along a length thereof, an indicator element movable along the length of the channel, the indicator element including a major portion and first and second peripheral portions, the first peripheral portion forming a first spring member having two ends, both ends being attached to the major portion, wherein the major portion and the first peripheral portion define a first aperture therebetween, and the second peripheral portion having two ends, both ends being attached to the major portion, wherein the major portion and the second peripheral portion define a second aperture therebetween;

wherein the first ad second spring members are integrally molded with the indicator element, and further wherein the first spring member is biased against only the first side wall of the channel and the second spring member is biased against the second side wall of the channel.

20. The data storage diskette of claim 19, wherein the first spring member includes an indentation and the first side wall includes a first structure extending into the channel, the indentation in the first spring member engaging the first structure during a portion of the movement of the indicator element along the length of the channel, the engagement of the first structure and the indentation exerting a force against movement of the indicator element along the length of the channel.

21. The data storage diskette of claim 20, wherein the second spring member includes an indentation and the second side wall includes a second structure extending into the channel, the indentation in the second spring member engaging the second structure during a portion of the movement of the indicator element along the length of the channel, the engagement of the second structure and the indentation exerting a force against movement of the indicator element along the length of the channel.

* * * * *